United States Patent [19]

Shurman et al.

[11] Patent Number: 4,684,431

[45] Date of Patent: Aug. 4, 1987

[54] APPARATUS FOR INTRODUCING APPLIQUES TO THE SIDEWALL OF A TIRE

[75] Inventors: Louis W. Shurman; Lynn A. Bryant, both of Canton, Ohio

[73] Assignee: The Firestone Tire & Rubber Company, Akron, Ohio

[21] Appl. No.: 766,388

[22] Filed: Aug. 16, 1985

[51] Int. Cl.⁴ .............................................. B29C 33/16
[52] U.S. Cl. ................................. 156/394.1; 156/116; 425/44
[58] Field of Search ............ 152/524; 156/116, 394.1, 156/416, 415, 540; 269/53, 54, 8, 54.5; 248/309.2; 425/44

[56] References Cited

U.S. PATENT DOCUMENTS

| | | | |
|---|---|---|---|
| 2,295,438 | 9/1942 | Vaniman | 156/116 X |
| 2,713,379 | 7/1955 | Sisson | 269/8 |
| 2,746,515 | 5/1956 | Usack | 156/116 |
| 2,802,512 | 8/1957 | Rouse | 156/116 |
| 3,073,371 | 1/1963 | Leeper | 152/330 |
| 3,113,902 | 12/1963 | Dismuke | 156/416 |
| 3,232,816 | 2/1966 | Fields | 156/116 X |
| 3,280,427 | 10/1966 | Smith | 18/13 |
| 3,285,314 | 11/1966 | Roberts | 152/523 |
| 3,329,551 | 7/1967 | Hutchinson | 156/394.1 |
| 3,332,820 | 7/1967 | Porter | 156/406.2 |
| 3,382,120 | 5/1968 | Rudder | 156/116 |
| 3,392,071 | 7/1968 | McGarthwaite et al. | 156/116 |
| 3,449,201 | 6/1969 | Palmquist et al. | 152/523 |
| 3,607,498 | 9/1971 | Kubota | 156/116 |
| 3,764,455 | 10/1973 | Lovell et al. | 161/162 |
| 3,865,663 | 2/1975 | Oka | 156/116 |
| 4,019,945 | 4/1977 | Look et al. | 156/116 X |
| 4,038,256 | 7/1977 | Finelli et al. | 260/75 NH |
| 4,072,645 | 2/1978 | Cogley, Jr. | 260/29.7 M |
| 4,170,503 | 10/1979 | Buchanan et al. | 152/523 X |
| 4,237,173 | 12/1980 | Kuan | 428/65 |
| 4,252,589 | 2/1981 | Hayakawa et al. | 156/116 |
| 4,256,159 | 3/1981 | Williams | 152/523 |
| 4,259,227 | 3/1981 | Ojakaar | 156/116 X |
| 4,317,479 | 3/1982 | McDonald | 152/523 |
| 4,506,442 | 3/1985 | Alzmann et al. | 269/54.5 X |

FOREIGN PATENT DOCUMENTS 54-69190  6/1979  Japan ................... 156/116

Primary Examiner—Donald E. Czaja
Assistant Examiner—Ramon R. Hoch
Attorney, Agent, or Firm—Daniel N. Hall

[57] ABSTRACT

Apparatus for positioning and maintaining a substrate within a tire mold. The substrate receives an applique which is to be transferred to the sidewall of a tire during the curing process. The substrate is of steel construction and is adapted to engage a receiving member within a circumferential surface of the tire mold. The receiving member is magnetized to attract the steel substrate and to retain the substrate and its applique in proper registration with the sidewall of the tire during closure of the mold and the curing process. A lip or pins are provided in association with the retainer to assure proper registration of the applique-bearing substrate with the tire sidewall.

12 Claims, 5 Drawing Figures

APPARATUS FOR INTRODUCING APPLIQUES TO THE SIDEWALL OF A TIRE

TECHNICAL FIELD

The invention herein resides in the art of vehicle tires and, more particularly, to tires having decorative appliques on the sidewalls thereof. Specifically, the invention relates to the structure and technique for receiving and securing an applique within a tire mold for transfer of the applique to the tire during the curing operation.

BACKGROUND OF THE INVENTION

Tires having decorative sidewalls have been well known and well received in the market. White or colored sidewall bands are commonplace, as are sidewalls having decorative lettering or any of various geometric designs thereon. Such decorative sidewalls have previously been constructed by use of a coextrusion process of black rubber along with colored or white rubber. Such a process is expensive, time consuming, and given to excessive waste. Further, decorative sidewalls are becoming an increasingly significant portion of the sidewall structure itself, but the coextrusions just mentioned are not ideal for structural integrity. Separate tire bodies are developed for black wall tires as distinguished from those tires which ultimately receive a decorative sidewall as by the application of a coextrudate of different rubber compounds. It has further been known that the generation of decorative sidewalls other than by the application of bands has been somewhat limited as to design and color, since variations in such decorations have previously required sophisticated and expensive dyes, molds, and the like.

Copending patent application Ser. No. 766,227, filed herewith, and assigned to the Firestone Tire & Rubber Company, the assignee of the instant application, sets forth a structure and technique which is a significant departure from the prior techniques discussed above. According to this copending application, a polymeric paint may be applied to a thermally stable substrate such as acetate, polyester, or treated paper, in a desired configuration such as a continuous band, selected lettering, or geometric designs. The substrate is placed into the tire curing mold with the polymeric paint in contacting engagement with a green tire. The tire is cured at an elevated temperature and pressure in standard fashion with the polymeric paint being transferred to the tire during the curing operation. The tire is removed from the mold with the substrate remaining on the decorative area, not to be removed until the tire is placed into use. In effect, the substrate serves as a protective coating for the decorative area of the sidewall, as well as a carrier for the applique when it is placed into the tire mold. The substrate is easily removed from the tire after curing because the adhering force of the polymeric paint to the tire due to the curing operation is significantly greater than the adhering force between the paint and the substrate.

While the substrate of the copending patent application serves well as a protective coating for the decorative applique during shipping, storage, and handling, the substrate is not sufficently firm to be easily handled and placed in the tire mold. Further, the substrate is not reuseable, but by its nature is disposable. Such a flexible substrate is difficult to register within the mold so as to guarantee that the substrate and applique is properly positioned with respect to the green tire. With a flexible substrate, the sidewall band deposited thereby may lose concentricity and integrity during mold closure. Finally, substrates of the type proposed in the copending application are not given to use in an automated process wherein a robotic arm may be required to place the decal-bearing substrate in the mold prior to curing and remove the substrate from the mold after curing.

DISCLOSURE OF INVENTION

In light of the foregoing, it is a first aspect of the invention to provide an apparatus for introducing appliques to the sidewall of a tire which allows for ease of registration of the applique with the tire in a tire mold.

Another aspect of the invention is the provision of an apparatus for introducing appliques to the sidewall of a tire wherein a substantially rigid and reuseable substrate is used as a carrier for the decal or applique.

Still an additional aspect of the invention is the provision of an apparatus for introducing appliques to the sidewall of a tire wherein the substrate is of such nature as to be easily placed into registered position within the mold by means of robotics.

Yet another aspect of the invention is the provision of an apparatus for introducing appliques to the sidewall of a tire wherein the substrate carrying the applique may be easily removed from the tire after the curing process.

The foregoing and other aspects of the invention which will become apparent as the detailed description proceeds are achieved by apparatus for securing an applique to a tire, comprising: a substrate maintaining said applique thereon; a tire curing mold for receiving the tire; and retaining means within said mold for making forceful securing engagement with said substrate, maintaining said substrate in a fixed position within said mold.

DESCRIPTION OF THE DRAWINGS

For a complete understanding of the objects, techniques, and structure of the invention reference should be had to the following detailed description and accompanying drawings wherein.

BEST MODE FOR CARRYING OUT THE INVENTION

Figure 1:
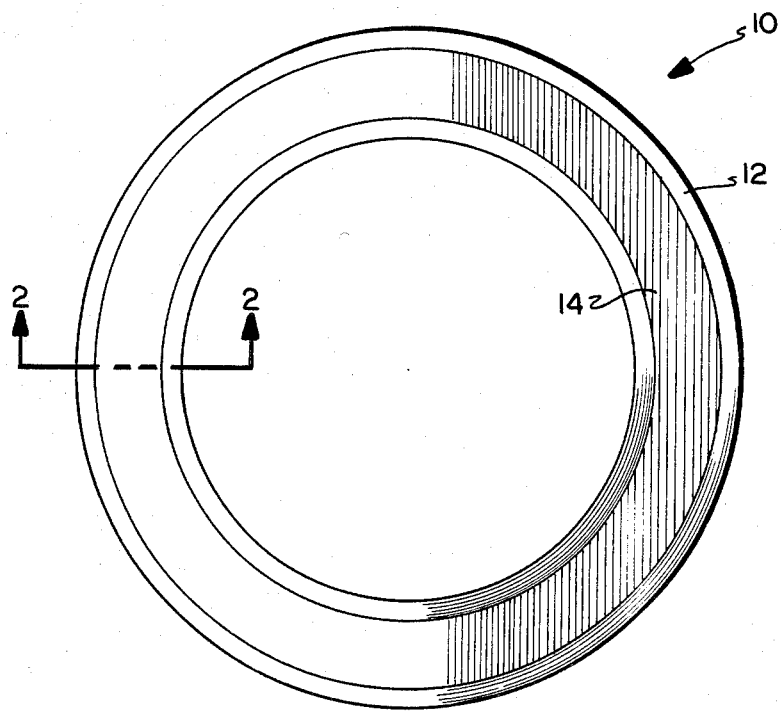
FIG. 1 is a top plan view of a substrate having a decal applique thereon.
Figure 2:
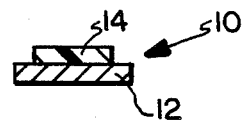
FIG. 2 is a cross sectional view of the structure of FIG. 1, taken along the line 2—2.

With reference now to the drawings and more particularly FIGS. 1 and 2, it can be seen that a decal assembly according to the invention is designated generally by the numeral 10. The assembly 10 includes a decal layer 14 received upon an appropriate substrate 12. In accordance with the preferred embodiment of the invention, the decal 14 consists of a polymeric paint, as set forth in the aforementioned copending patent application, upon a substrate 12. In accordance with the preferred embodiment of the invention, the substrate 12 is preferably of a somewhat rigid material, facilitating handling of the assembly 10 and guaranteeing maintainence of the integrity of the applique represented by the decal layer 14. It will of course be understood that while the layer 14 is shown as a band, to impart a colored band or "white sidewall" to a tire, the decal layer 14 may take on any of numerous geometric configurations and designs, including letters, at any of various points upon the substrate 12, dependent upon the ultimate design desired.

The decal assembly 10 of FIGS. 1 and 2 would typically be placed in a tire mold wherein a green tire would be placed for curing. Upon closure of the mold halves to begin the curing operation, the polymeric paint of the decal layer 14 would be brought into contacting engagement with the sidewall of the green tire. The temperature and pressure of the curing operation, as typically experienced in a vulcanizing process, would then bond the decal 14 to the sidewall of the tire. When the curing process is completed, and the molds opened, the substrate 12 need merely be removed from the sidewall of the tire to present a tire having a decorative applique on the sidewall.

Figure 3:
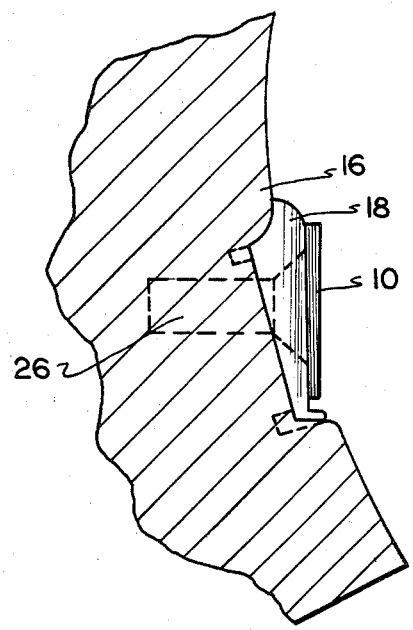
FIG. 3 is a partial sectional view of a tire mold receiving the structure of FIG. 1.
Figure 4:
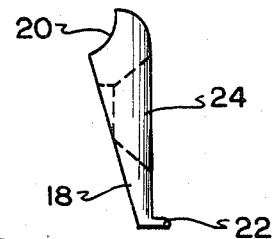
FIG. 4 is a sectional view of the magnetized substrate retainer received within the mold of FIG. 3.

FIG. 3 presents a partial sectional view of a tire mold half shown receiving the substrate retainer 18 which is depicted more fully in cross section in FIG. 4. It will be readily understood by those skilled in the art that a tire mold 16 typically comprises two halves in a clam-shell fashion. It will further be understood that the molds are bowl-shaped. Accordingly, the substrate retainer 18 comprises a continuous band maintained about an inner circumferential surface of one of the halves of the tire mold 16, as shown. Obviously, the band 18 will be maintained in that portion of the mold cavity which closes adjacent to and forms the sidewall of the tire. As shown in the embodiment of FIGS. 3 and 4, the substrate retainer 18 is received within a recess or housed-out portion of the mold 16, mating with such recess. As shown in FIG. 4, an arcuate surface 20 is provided to mate with a corresponding arcuate surface on the edge of the recess of the mold 16. A lip or flange 22 circumferentially extends about the band of the retainer 18 and is received upon a ledge of the recess within the mold 16. The substrate retainer 18 is drilled and counterbored as at 24 at various spaced points about the circumference thereof. The counterbores receive screws 26 which provide for engagement of the substrate retainer 18 with the mold 16 as best shown in FIG. 3.

Figure 5:
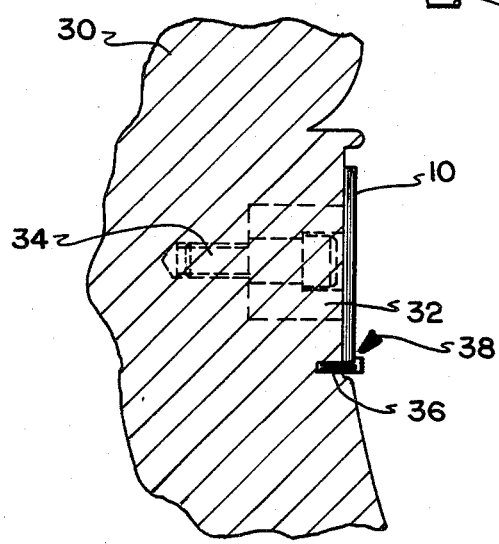
FIG. 5 is a partial sectional view of the tire mold showing yet another type of magnetized substrate retainer within the mold.

Yet another embodiment of the invention is set forth in FIG. 5, where a tire mold is shown in partial cross section by the numeral 30. An annular ring or band 32 is counterbored at various points about the circumference thereof to be secured to a circumferential recess within the mold 30 as by bolts 34. Pins 36 extend from the mold 30 in fixed spaced relationship from the annular member 32 for purposes of providing means for registering the decal assembly in a manner to be described hereinafter. Suffice it to say at this time that at least three such pins 26 extend from the mold 30 slightly into the mold cavity and in fixed spaced relationship from the annular member or ring 32.

It will be appreciated by those skilled in the art that the tire molds 16,30 are typically constructed of aluminum for heat conductive purposes. In accordance with the embodiments of the invention, the substrate retainer 18 and annular ring 32 are constructed of steel. The members 18,32 may be either constructed of permanently magnetized steel or of steel which may be selectively magnetized as by connection with an electromagnet. The substrate 12 is also constructed of steel, having a thickness of 14-30 gauge, preferably 16 gauge. Such a thickness provides a degree of rigidity to the substrate 12 which is then capable of receiving and maintaining the decal layer 14 thereon in the form of polymeric paint which is appropriately deposited as by spraying, screening, brushing, or the like. The rigidity of the substrate 12 allows the decal layer 10 to maintain its integrity since the substrate will not be readily given to flexing or bending.

Suffice it to say that the steel substrate 12 may be attracted and held by the substrate retainers 18,32 by means of the magnetic force characteristic of those elements. In the case of the substrate retainers 18,32 being permanently magnetized, there would constantly be an affinity or attraction of the substrate 12 to the members 18,32. In the case of the employment of an electromagnet, the attraction would only occur when the electromagnet was energized, temporarily magnetizing the members 18,32.

It is contemplated that the magnetic force of the substrate retainers 18,32 would be sufficient to hold the substrate 12 in place during mold closure and during the curing process. However, after the polymeric paint of the decal layer 14 is bonded to the tire by the curing process, the force of adherence between the polymeric paint and both the tire and the substrate 12 is greater than the magnetic force between the substrate 12 and the substrate retainer 18,32. Thus when the tire is taken from the mold, the decal assembly 10 will be adhered to the tire, with the substrate being subsequently removed from the decal layer 14 which remains adhered to the tire. In other words, the magnetic force between the retainer 18,32 and the substrate 12 is less than the bonding or stripping force between the substrate 12 and the decal layer 14, which in turn is less than the bonding force between the decal layer 14 and the tire. Provision of magnetic force of this amplitude allows the substrate 12 to be removed from the mold with the tire, but then requires the additional step of stripping the substrate from the tire.

Where the magnetic force of the substrate retainers 18,32 is provided by means of an electromagnet, the electromagnetic force may simply be turned off upon closure of the mold or upon termination of the curing process. In the absence of the electromagnetic force, the substrate 12 will readily separate from the substrate retainer 18,32.

Finally, the magnetic force between the substrate 12 and the substrate retainer 18,32 may be selected to exceed the bonding force between the substrate 12 and the decal layer 14. In such case, after the curing process is completed, the mold will open with the magnetic attraction for the substrate 12 being sufficient to overcome the bonding force with the decal layer 14, pulling the substrate 12 from the decal layer 14 and leaving the decal totally embossed upon the tire sidewall. In the case of a permanent magnet, force must then be applied to retrieve the substrate 12 from the substrate retainer 18,32, but in the case of an electromagnet, the electromagnet simply need be deenergized to retrieve the substrate 12.

In any event, once the substrate 12 has been removed from the decal layer 14 which is bonded by greater force to the tire, the substrate 12 is ready to be reused by the application of a new decal layer 14.

It will be noted that the instant invention is readily given to implementation by means of robotics. As shown in the embodiment of FIGS. 3 and 4, a circumferential flange or lip 22 is provided for receiving the decal assembly 10 in proper registration. A robotic arm or the like may simply place the decal assembly 10 into contact with the magnetized substrate retainer 18 with a circumferential surface thereof abutting or lying within the lip 22 in order to guarantee that the decal layer 14 carried upon the substrate 12 is in proper registration with the tire received within the tire mold. Such a function is easy to perform with modern day robotics.

In like manner, the embodiment of FIG. 5 may be used. Here, a robotic arm simply places the decal assembly 10 into contacting engagement with the magnetic retainer or annular member 32 with a circumferential surface of the assembly 10 lying within the circle defined by the plurality of pins 36 extending from the mold 30. As noted above, there are preferably three such pins to guarantee proper alignment. With the substrate 12 falling within all three alignment pins 36, it is assured that the decal layer 14 is in proper registration with the sidewall of the tire to be molded.

With further reference to FIG. 5, yet another embodiment of the invention may be seen and understood. In this embodiment, no magnetizing force is employed to secure the substrate 12 of the assembly 10 to the mold 30. In this case, the pins 36 which are received by the mold 30 are notched as at 38, providing a retaining area between the head of the pin 36 and the body of the cavity 30. Preferably, at least three such pins would be provided within the mold cavity 30 for receiving the substrate 12. It should be noted that it is the inner circumferential edge of the substrate 12 which would be received by the notches 38 of the pin 36.

In operation, with the mold opened, a robotic arm would snap the substrate 12 over the heads of the pins 36 to be received by the notched areas 38 thereof. The inner circumferential edge of the substrate 12 would simply deflect over the pin heads and into the notched area. The mold would then close and temperature and pressure would increase for the curing process. With the elevation of temperature, the metallic substrate 12 would expand according to its coefficient of thermal expansion, such expansion resulting in an increase in its inner diameter, to the extent that the inner diameter of the substrate 12 would exceed the diameter of the circle defined by the spacing of the heads of the pins 36. Accordingly, when the mold is opened, the substrate 12 readily separates from the pins 36, remaining adhered to the tire. In such case, of course, the substrate 12 must then be stripped from the tire in a subsequent operation.

It should also be appreciated that while the substrate 12 has typically been shown as being of a flat nature, in practice the substrate 12 would have the same contour as that portion of the sidewall of the tire with which it is to mate. Accordingly, a slight curvature might typically be imparted to the substrate 12 to accommodate the sidewall curvature.

From the foregoing, it should be appreciated that the instant invention contemplates means for securing, within a tire, mold a substrate maintaining thereon a decal or applique to be transferred to a tire during the curing process. Various other embodiments could readily be conceived by those skilled in the art having the benefit of the teachings presented above. Suffice it to say that the invention contemplates a substrate of a substantially stiff material which may be received and maintained by a mold by means of any suitable force imparted by any suitable means. Releaseable clips, tabs, and the like should be readily understood by those skilled in the art as being suitable for this purpose. It is further presented that the substrate 12 may be made from any suitable material. Where magnetic force is involved, the material is preferably steel, but the substrate may itself be provided with some type of protective coating such as plastic or the like. In the last presented embodiment, a material having a suitable coefficient of thermal expansion would, of course, be necessary. Where clips or tabs are used, a totally plastic substrate would be sufficient.

Thus it can be seen that the objects of the invention have been satisfied by the structure presented hereinabove. While in accordance with the patent statutes only the best mode and preferred embodiment of the invention has been presented and described in detail, it will be understood that the invention is not limited thereto or thereby. Accordingly, for an appreciation of the true scope and breadth of the invention reference should be had to the following claims.

What is claimed is:

1. Apparatus for securing an applique to a tire, comprising:
    a ring maintaining said applique thereon;
    a tire curing mold for receiving the tire; and
    a magnetized element within said mold for making forceful securing engagement with said ring, maintaining said ring in a fixed position within said mold by magnetically attracting said ring to said magnetized element.

2. The apparatus according to claim 1 wherein said magnetized element comprises an annular member circumferentially maintained about an inner surface of said mold.

3. The apparatus according to claim 2 wherein said annular member is selectively magnetized.

4. The apparatus according to claim 2 wherein said annular member is maintained within a recess within an inner circumferential surface of said mold.

5. The apparatus according to claim 2 wherein said annular member has a lip extending about an outer edge thereof for registering said ring upon said annular member.

6. The apparatus according to claim 2 which further includes a plurality of pins extending from said mold in juxtaposition to said annular member, said pins adapted to receive said ring.

7. The apparatus according to claim 2 wherein the force between said magnetized annular member and said ring exceeds a force of adherence between said ring and said applique.

8. The apparatus according to claim 2 wherein the force between said magnetized annular member and said ring is less than the force of adherence between said ring and said applique.

9. Apparatus for imparting decorative designs to the sidewall of a tire, comprising:
    a substrate having a decal thereon;
    a tire curing mold; and
    means within said tire mold for receiving and forcefully retaining said substrate in registration within said mold, said means comprising pins extending from a surface of said tire curing mold, said pins adapted to engage said substrate about a periphery thereof, said substrate being of a material having a coefficient of thermal expansion allowing the substrate to expand and disengage from said pins upon heating said substrate.

10. The apparatus according to claim 9 wherein said substrate comprises a steel ring.

11. The apparatus according to claim 10 wherein said pins each have a head at one end thereof and which are characterized by a notch beneath said head, said notch receiving said substrate.

12. The apparatus according to claim 11 wherein three pins are provided for engagement about said periphery of said substrate.

* * * * *